(12) United States Patent
Yu et al.

(10) Patent No.: US 8,966,988 B2
(45) Date of Patent: *Mar. 3, 2015

(54) ULTRA-MINIATURE FIBER-OPTIC PRESSURE SENSOR SYSTEM AND METHOD OF FABRICATION

(75) Inventors: Miao Yu, Potomac, MD (US);
Hyungdae Bae, College Park, MD (US);
Xuming Zhang, New Territories (HK)

(73) Assignee: University of Maryland, College Park, MD (US)

(*) Notice: Subject to any disclaimer, the term of this patent is extended or adjusted under 35 U.S.C. 154(b) by 342 days.

This patent is subject to a terminal disclaimer.

(21) Appl. No.: 13/440,139

(22) Filed: Apr. 5, 2012

(65) Prior Publication Data

US 2012/0210797 A1    Aug. 23, 2012

Related U.S. Application Data

(63) Continuation-in-part of application No. 12/849,436, filed on Aug. 3, 2010, now Pat. No. 8,151,648.

(51) Int. Cl.
*G01L 7/00* (2006.01)
*G01L 9/00* (2006.01)
*G02B 6/26* (2006.01)
*G02B 6/42* (2006.01)
*G02B 26/00* (2006.01)

(52) U.S. Cl.
CPC .............. *G01L 9/0079* (2013.01); *G02B 6/262* (2013.01); *G02B 6/4214* (2013.01); *G02B 26/001* (2013.01)

USPC ........................................................ 73/705

(58) Field of Classification Search
USPC ................................................. 73/700–756
See application file for complete search history.

(56) References Cited

U.S. PATENT DOCUMENTS

| | | |
|---|---|---|
| 5,844,667 A | 12/1998 | Maron |
| 6,016,702 A | 1/2000 | Maron |
| 6,131,465 A | 10/2000 | Wlodarczyk et al. |
| 6,218,661 B1 | 4/2001 | Schroeder et al. |
| 6,506,313 B1 | 1/2003 | Fetterman et al. |
| 6,597,821 B1 | 7/2003 | Bohnert et al. |
| 6,820,488 B2 | 11/2004 | Lenzing et al. |
| 7,689,071 B2 | 3/2010 | Belleville et al. |
| 2004/0031326 A1 | 2/2004 | Lenzing et al. |
| 2005/0041905 A1 | 2/2005 | Lagakos et al. |

*Primary Examiner* — Andre Allen
(74) *Attorney, Agent, or Firm* — Rosenberg, Klein & Lee

(57) ABSTRACT

Ultra-miniature surface-mountable optical pressure sensor is constructed on an optical fiber. The sensor design utilizes an angled fiber tip which steers the optical axis of the optic fiber by 90°. The optical cavity is formed on the sidewall of the optic fiber. The optical cavity may be covered with a polymer-metal composite diaphragm to operate as a pressure transducer. Alternatively, a polymer-filled cavity may be constructed which does not need a reflective diaphragm. The sensor exhibits a sufficient linearity over the broad pressure range with a high sensitivity. The sensitivity of the sensor may be tuned by controlling the thickness of the diaphragm. Methods of batch production of uniform device-to-device optical pressure sensors of co-axial and cross-axial configurations are presented.

33 Claims, 11 Drawing Sheets

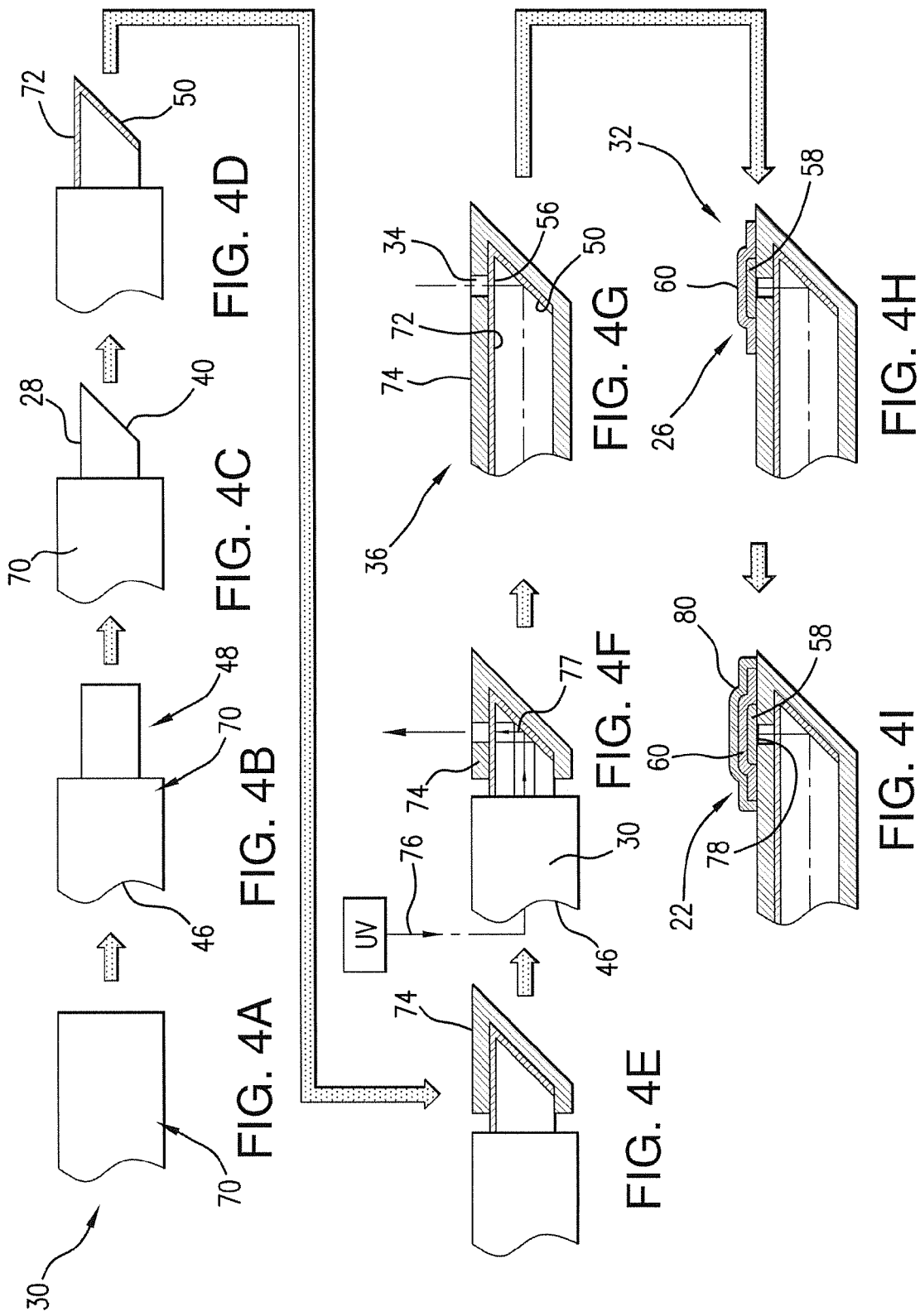

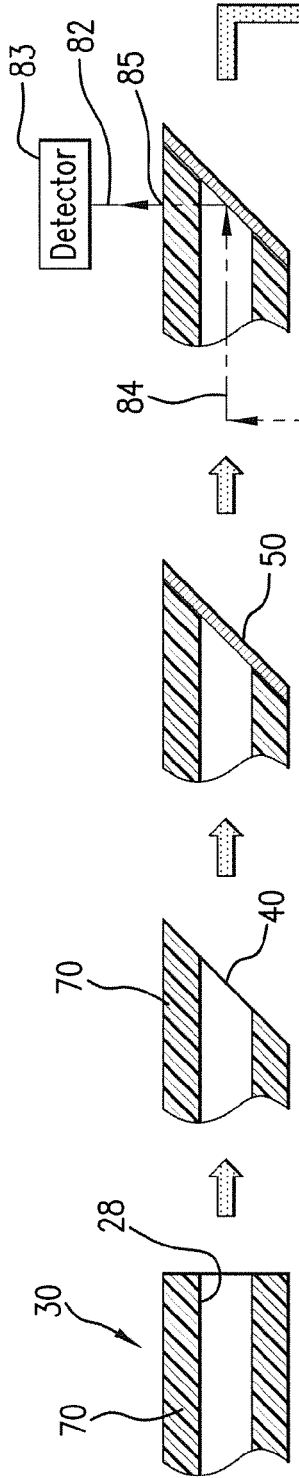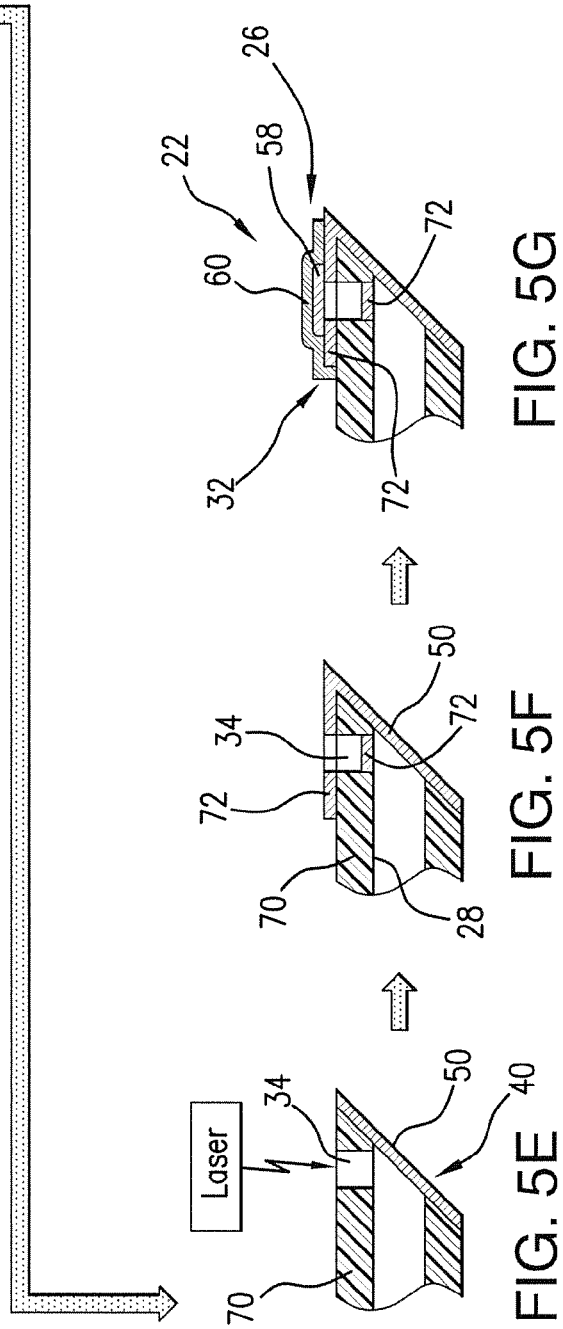

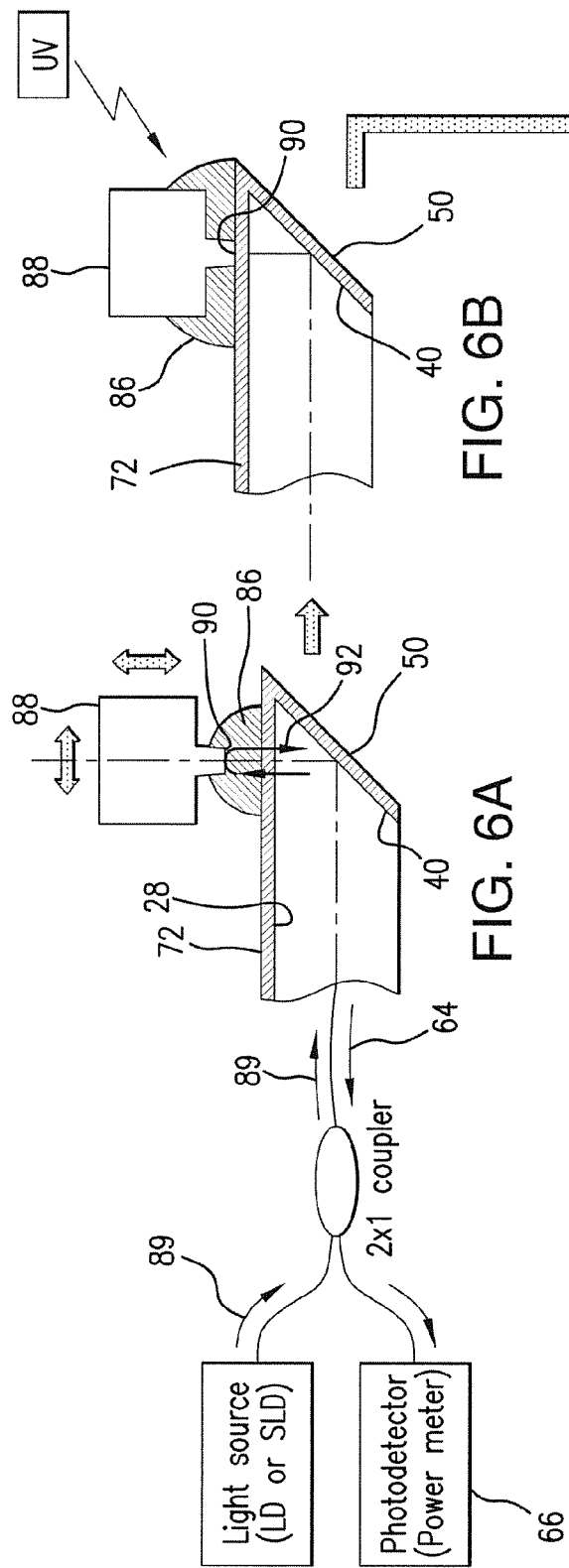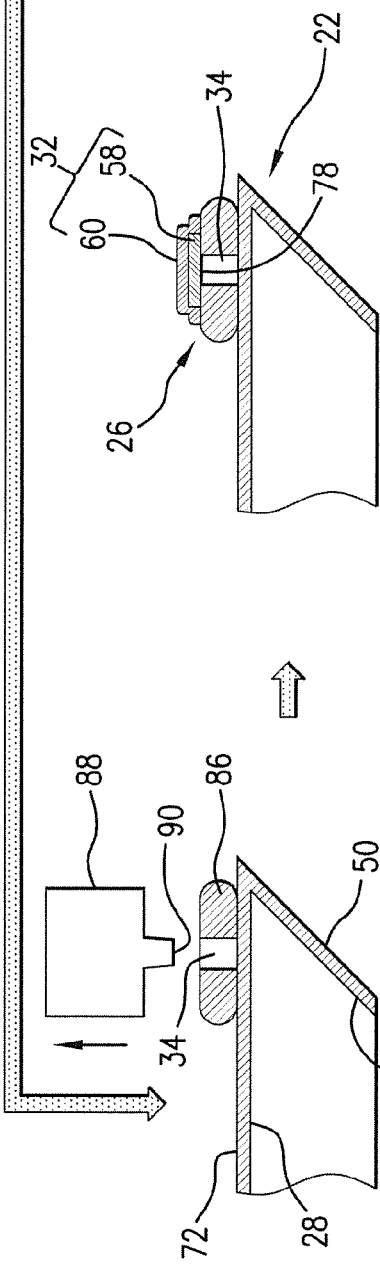

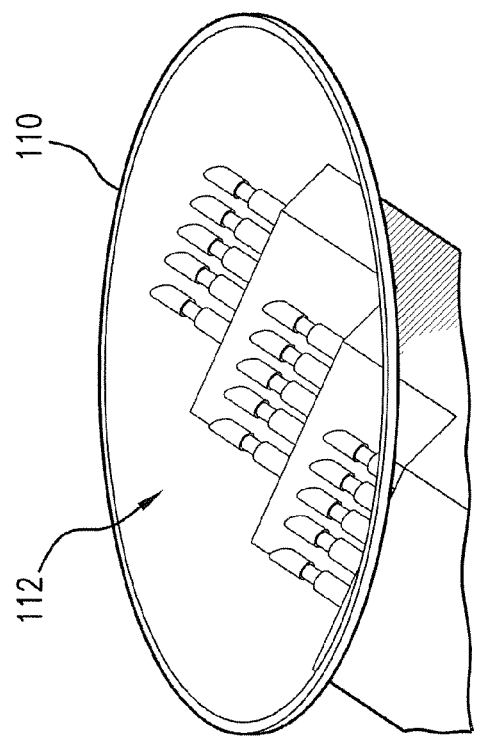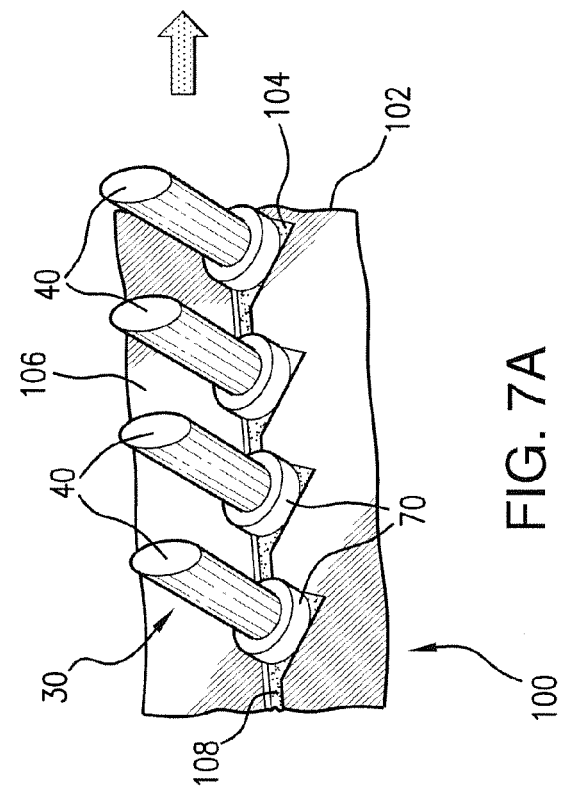
FIG. 7A
FIG. 7B

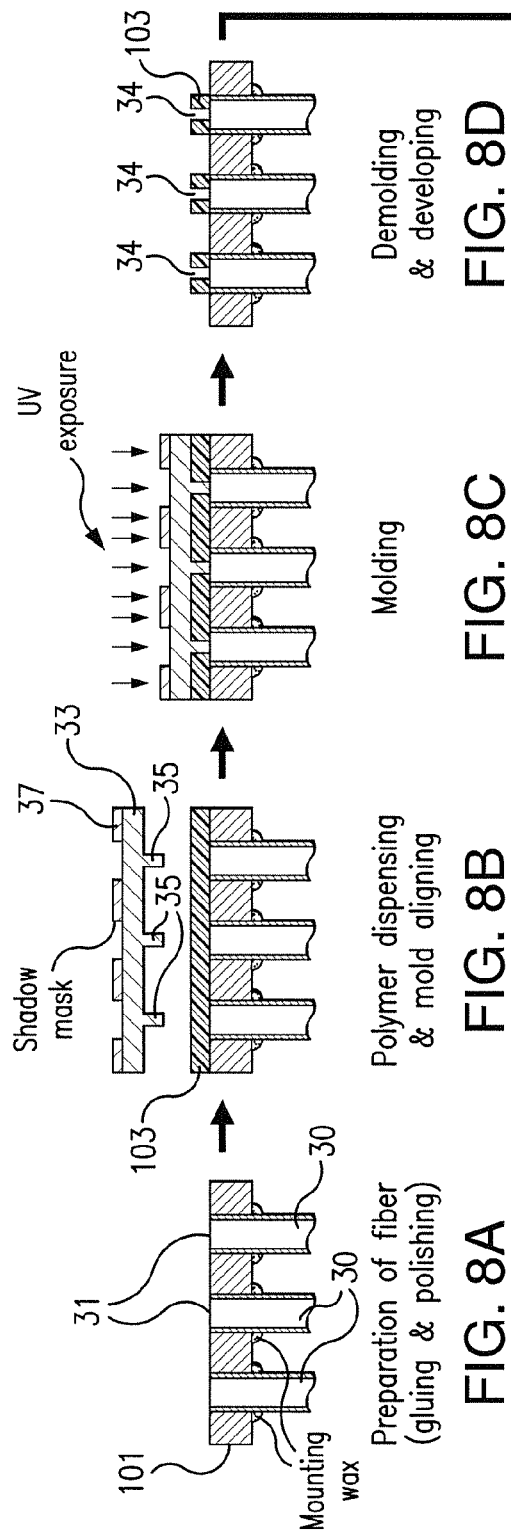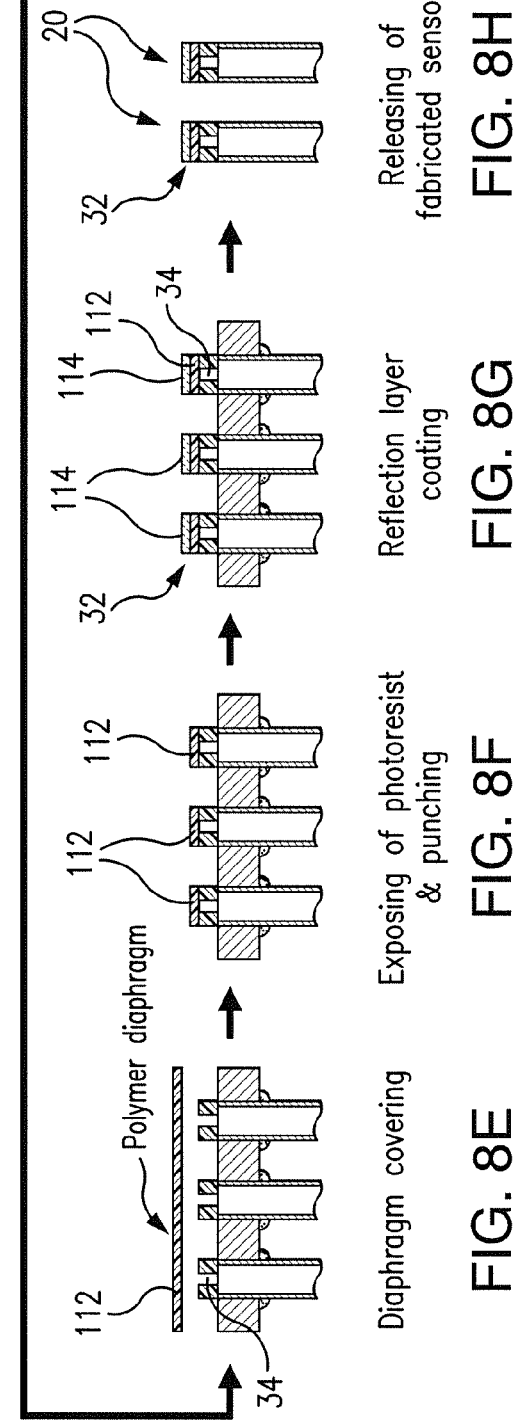

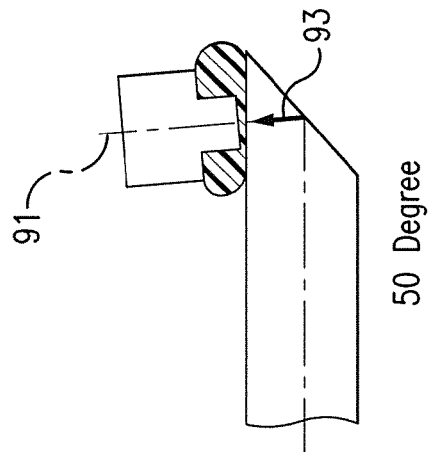
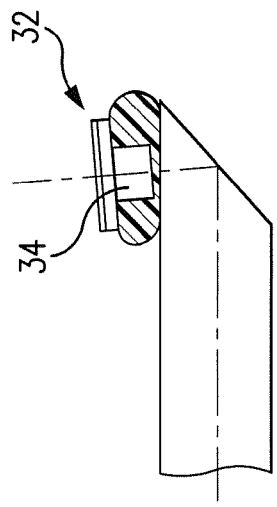
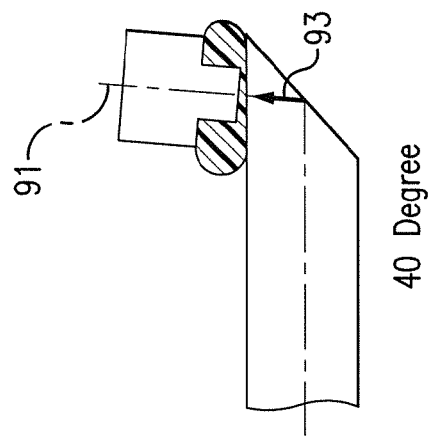
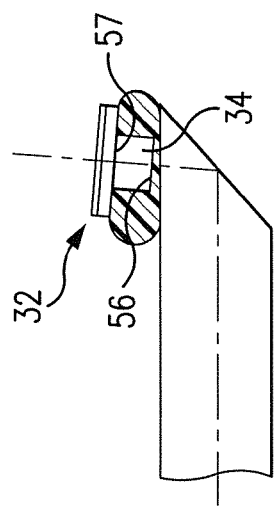
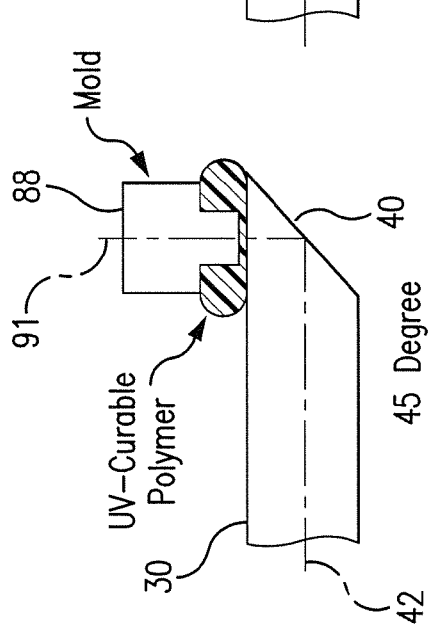
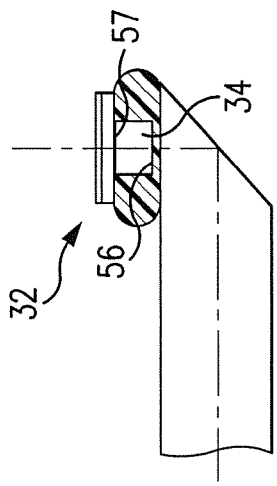

US 8,966,988 B2

ULTRA-MINIATURE FIBER-OPTIC PRESSURE SENSOR SYSTEM AND METHOD OF FABRICATION

REFERENCE TO RELATED APPLICATIONS

This Utility patent application is a Continuation-In-Part of application Ser. No. 12/849,436 filed on 3 Aug. 2010, currently pending.

The U.S. Government has certain rights to the invention. The work was funded by NSF Contract No. CMMI0644914.

FIELD OF THE INVENTION

The present invention relates to microsensors, and more in particular, to ultra-miniature pressure sensors formed on optical fibers.

In overall concept, the present invention is directed to an ultra-miniature pressure sensor system in which a sensor element (sensing head) features an optical cavity structure formed on an optical fiber.

Additionally, the present invention relates to a surface-mountable fiber-optic ultra-miniature optical pressure sensor that utilizes internal reflection at an angled fiber end surface to steer the optical axis by 90° in order to redirect the light travelling along the optical guide channel to impinge on the fiber sidewalls at a location where an optical cavity structure is formed. The optical cavity structure may include a Fabry-Perot cavity, or any other air-filled cavity covered with a polymer-metal composite diaphragm serving as a pressure transducer to detect pressure whose direction is perpendicular to a surface of interest. Alternatively, the optical cavity structure may be fabricated in the form of a polymer-filled optical cavity in which the interface between the polymer and the air functions as the diaphragm of the air-filled cavity.

The present invention is further directed to ultra-miniature pressure sensors which are suitable for space-constrained biomedical applications that require minimally invasive, in vivo pressure monitoring of body fluids, and are envisioned in a broad range of highly sensitive pressure measurements in a single sensing head structure or as sensing networks capable of interrogating an array of sensing heads in question.

Additionally, the present invention is directed to a fabrication method for a surface-mountable ultra-miniature fiber-optic pressure sensor system having high sensitivity which may be used as miniature microphones for various surveillance and industry applications as well as for aerodynamic measurements without disturbing a measurand while being electromagnetic interference resistant.

The present invention is further directed to a simple and inexpensive batch production of pressure microsensors which yields high device-to-device uniformity.

BACKGROUND OF THE INVENTION

Fiber optic sensors are widely used due to their light weight, miniature dimensions, low power consumption, electromagnetic interference resistance, high sensitivity, wide bandwidths and environmental ruggedness in combination with low cost and well developed fabrication techniques. Among fiber optic sensors, Fabry-Perot based pressure transducers are widely used for localized measurements free of a measurand disturbance. This type of sensor detects changes in optical path length induced by a change in the refractive index or a change in physical length of the Fabry-Perot cavity. The Fabry-Perot sensors are attractive for their miniature size, low cost of the sensing element, and compatibility with low coherence light sources, such as light emitting diodes.

In Fabry-Perot cavity based sensors, pressure is measured by detecting deflection of a membrane to which the pressure is applied. By using the optical measurements, a remote data acquisition may be achieved without loss of signal-to-noise ratio.

Shown in FIG. 1, is a co-axial configuration of fiber pressure sensor which has a Fabry-Perot cavity 10 formed at the end of the optical fiber 12. The cavity 10 is surrounded by a housing 14 and is covered by a diaphragm 16. In this co-axial configuration, the optical characteristics of the light traveling along the fiber optical guide channel 18 are responsive to the pressure field having a direction parallel to the optical axis of the fiber. These co-axially configured fiber sensors are not surface-mountable.

It would be highly desirable to combine the attractive characteristics of the fiber based ultra-miniature pressure sensors with the ability of being surface-mountable to sense and measure pressure fields directed perpendicularly to the surface.

SUMMARY OF THE INVENTION

It is therefore an object of the present invention to provide a surface-mountable ultra-miniature fiber-optic pressure sensor system capable of optical measurements of pressure fields directed perpendicular to the surface of interest.

It is a further object of the present invention to provide a unique fabrication technique for a surface-mountable ultra-miniature fiber-optic pressure sensor system where each sensor element features an optical cavity structure formed externally to the fiber sidewall in cross-axial relationship with the optical axis of the fiber.

It is another object of the present invention to provide a fiber optic pressure sensor system in which a surface-mountable sensing head has an angled fiber end surface utilized to redirect the light traveling within the optical fiber to impinge onto the sidewall at a location where the optical cavity structure is formed for sensing a pressure field applied thereto.

It is also an object of the present invention to provide a fabrication technique which permits batch production of ultra-miniature fiber-optic pressure sensors, both co-axial and surface-mountable, that yields high device-to-device uniformity in an efficient fashion.

It is another object of the present invention to provide a biologically compatible ultra-miniature fiber-optic pressure sensor system suitable for low-invasive measurements in medical in vivo applications.

It is an additional object of the present invention to provide a Spatial-Division-Multiplexing (SDM) sensor network capable of high performance interrogation of a plurality of ultra-miniature fiber-optic surface-mountable pressure sensors.

In one aspect, the present invention is directed to a pressure sensor system, which utilizes one or more ultra-miniature surface-mountable sensing heads, each formed on an optical fiber with the tip contoured with an end surface angled relative to the longitudinal axis of the optical fiber to provide total internal reflection of the incidence light. The angled end surface, optionally, may be covered with a reflective material to enhance the reflection.

The operation of the sensing head is based on an optical cavity structure which is located externally on the sidewall of the optical fiber and may have a diaphragm covering the air-filled cavity. A specific location of the optical cavity structure at the sidewall of the fiber is defined at a spot where the light traveling along the optical guide channel of the optical fiber and being redirected by the angled end surface, impinges on the sidewall of the optical fiber.

The pressure applied to the diaphragm on the top of the optical cavity structure changes the optical characteristics of the light signal traveling in the optical fiber, and thus may be detected by a light detector coupled to the fiber output optical signal. The detected output light signal is further processed to transform the changes in the optical signal characteristics into an applied pressure.

The optical cavity structure may include an air-filled optical cavity defined in a cavity confining layer formed externally of the fiber sidewall and a polymer-metal composite diaphragm covered on the top of the optical cavity, or a polymer filled cavity which does not require a reflective diaphragm since the interface between the polymer and the air ambient serves the purpose.

The composite polymer-metal diaphragm on the air-filled optical cavity is a thin membrane of nanometer-scale to micrometer-scale uniform thickness which may be covered with one or more additional polymer layers to enhance mechanical stability, provide biological compatibility of the sensing head, as well as to fine tune the sensitivity of the sensing head by controlling the number of additional polymer layers on the diaphragm. In the embodiment based on a polymer-filled optical cavity, the interface between the optical cavity and ambient air acts as a reflective layer due to the refractive index difference therebetween. Additional metal layer or optical coating can be used to increase reflectivity at the interface, and to block unwanted light from ambient.

The cavity confining layer formed on the sidewall of the optical fiber may be of a photoresistive nature. Alternatively, the optical cavity may be formed in a jacket of the optical fiber, or in a UV-curable composition deposited on the sidewall. A reflective layer is preferably positioned at the bottom of the optical cavity to enhance visibility of an optical signal by increasing reflectance of the outer surface of the optical fiber.

The sensing head is surface-mountable and may be installed on a substrate to sense the pressure field applied to the diaphragm in a direction perpendicular to the substrate surface. A light source generating an optical input signal coupled to the input end of the optical fiber, a light detector to detect the optical signal emanating from the optical fiber, and a signal processing unit coupled to the light detector for determining the characteristics of the optical output signal are provided in systems using a single sensing head or in sensor networks.

Another aspect of the present invention constitutes a method for manufacturing a surface-mountable ultra-miniature fiber-optic pressure sensor, which is carried out by the steps of:

contouring a tip of an optical fiber with an end surface angled relative to the optical guide channel;

optically coupling a light beam to an input end of the optical fiber in order that the light beam travels from the input end to the tip of the optical fiber along the optical guide channel and is re-directed at the reflective angled end surface toward the sidewall of the optical fiber; and fabricating an optical cavity structure at the spot where the redirected light impinges on the sidewall of the fiber. The optical cavity structure may be formed as an air-filled cavity with a diaphragm covering a top of the cavity, or as a polymer-filled cavity which does not necessitate a diaphragm.

There are several alternative approaches, to carrying out the fabrication of the subject sensing head. In one of the approaches the cavity may be formed within the fiber jacket. In this case, the laser beam is transmitted from the input end of the optical fiber to the angled reflective surface, and the location of the optical cavity structure is found by sensing the laser beam emanating through the sidewall of the optical fiber. At the location where the laser beam is sensed, the optical cavity structure is formed by a subtraction technique applied to the fiber jacket, including laser ablation, wet and dry etching, or photoresist developing technique.

Alternatively, the optical cavity structure may be formed in a photoresist covering the sidewall of the optical fiber. In this embodiment, prior to the contouring the tip end of the optical fiber with the reflective angled surface, the fiber jacket is removed, the exposed sidewall is covered with a reflective material, and a photoresist layer is deposited on the sidewall reflective layer. Subsequently, the UV light beam is coupled to the input end of the optical fiber, and, being redirected at the reflective angled end surface, is incident on the sidewalls of the optical fiber, in order to UV pattern the photoresist layer. The photoresist layer is a positive resist, and when exposed to light, becomes soluble to a photoresist developer. The patterned photoresist layer is further exposed to a developer to remove the soluble matter, thereby creating a cavity within the photoresist.

In a further embodiment, the fiber jacket is peeled from the optical fiber, a reflective layer is deposited on the exposed sidewall, and a predetermined volume of a UV-curable material is deposited on the reflective layer. A mold contoured oppositely to the shape of the desired optical cavity structure is then aligned with the intended cavity location and is lowered into the UV-curable material. After the UV-curing is performed, the mold is removed.

Upon forming a cavity by any of these techniques, a composite diaphragm formed of a polymer diaphragm layer and a reflective diaphragm layer is covered on the top opening of the optical cavity. The polymer diaphragm layer is pre-formed separately to have a uniform thickness in a nanometer-scale range.

The present invention further is directed to a method of batch fabrication of a plurality of ultra-miniature fiber-optic pressure sensors, yielding high uniformity of device-to-device dimensional and operational characteristics. The batch fabrication includes the steps of:

securing a plurality of optical fibers in a fiber holder (wafer) in aligned disposition each with respect to the other, and polishing the tips of the optical fibers to form end surfaces.

The subject batch production method is applied to fabrication of both the cross-axial configuration and co-axial configuration of the sensing heads. For the cross-axial configuration, the tips of the optical fibers are polished to contour the tips with angled end surfaces. For the co-axial configuration, the tips of the optical fibers are polished to form end surfaces perpendicular to the optical axis of the fibers.

After the tips are polished, the subsequent steps of the subject method include:

optionally depositing a reflective layer on the angled end surfaces of the optical fibers, optionally depositing a sidewall reflective layer on the fibers sidewalls, forming a photoresist layer on the sidewall (or the sidewall reflective layer) of the fibers, coupling a light beam into the optical fibers at the input ends to pattern the photoresist at a location of the optical cavity structure to be formed, and developing the patterned photoresist on fibers, thus simultaneously forming optical cavities at the sidewalls of the plurality of fibers.

Alternatively, for the mass production of the cross-axial and co-axially configured sensing heads, after polishing the end face either perpendicular to the optical axis of the fibers (for the co-axial configuration), or angled relative to the optical axis of the fibers (for the cross-axial configuration), the method further proceeds in the following fashion:

UV-curable material is deposited on the wafer to cover the polished tips of the optic fibers, a mold contoured oppositely to the shape of the desired optical cavities is aligned with desired cavities locations and is lowered into the UV-curable material.

After the UV-exposure, the mold is removed, and the cavities formed either in the end surface of each fiber, or at the sidewall thereof, are covered with a polymer diaphragm, which is subsequently punched to result in a plurality of separate structures, each of which is covered with a reflection coating in a subsequent step. Finally, the fabricated sensors are released from the wafer.

Alternatively, upon forming the cavities at the fibers (either on the sidewalls or at the end face), the method further may include the steps of:

pre-forming a thin polymer film of a uniform thickness (the thickness may range in nm to μm scale), attaching the polymer film on the cavities of the plurality of optical fibers, thus forming polymer diaphragm layer, and coating the reflective coating, i.e. the reflective diaphragm layer, on the patches of the polymer diaphragm layer on the cavities.

The reflective layer may be coated on the angled end surface, as well as on the sidewall and on the polymer diaphragm layer by any technique including sputtering, evaporation, electroplating, bonding or sticking.

These and other features and advantages of the present invention will be apparent from the following detailed description taken in conjunction with accompanying Patent Drawings.

BRIEF DESCRIPTION OF THE DRAWINGS

FIGS. 4A-4I represent a sequence of the manufacturing steps of the present method in one embodiment thereof;

FIGS. 5A-5G show in sequence the manufacturing steps of the present method in an alternative embodiment;

FIGS. 6A-6D show in sequence the manufacturing steps of the present method in yet another alternative embodiment;

FIGS. 7A-7B are prospective views of fabrication tools for batch production of the sensors of the present invention;

FIGS. 8A-8H show in sequence the manufacturing steps of an alternative embodiment of the batch fabrication method in accordance with the present invention;

FIGS. 9A-9F represent schematically a technique for compensation for deviation of the end surface from a predetermined angle;

DETAILED DESCRIPTION OF THE PREFERRED EMBODIMENTS

Figure 1:
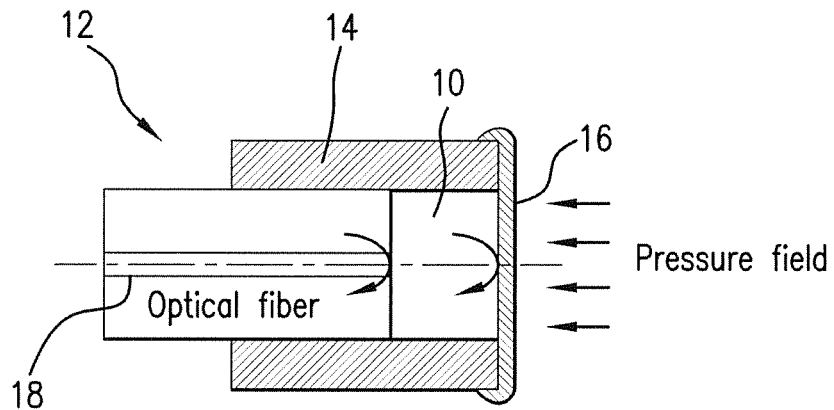
FIG. 1 is a schematic representation of a coaxial configuration of a conventional fiber-optic pressure sensor.
Figure 2:
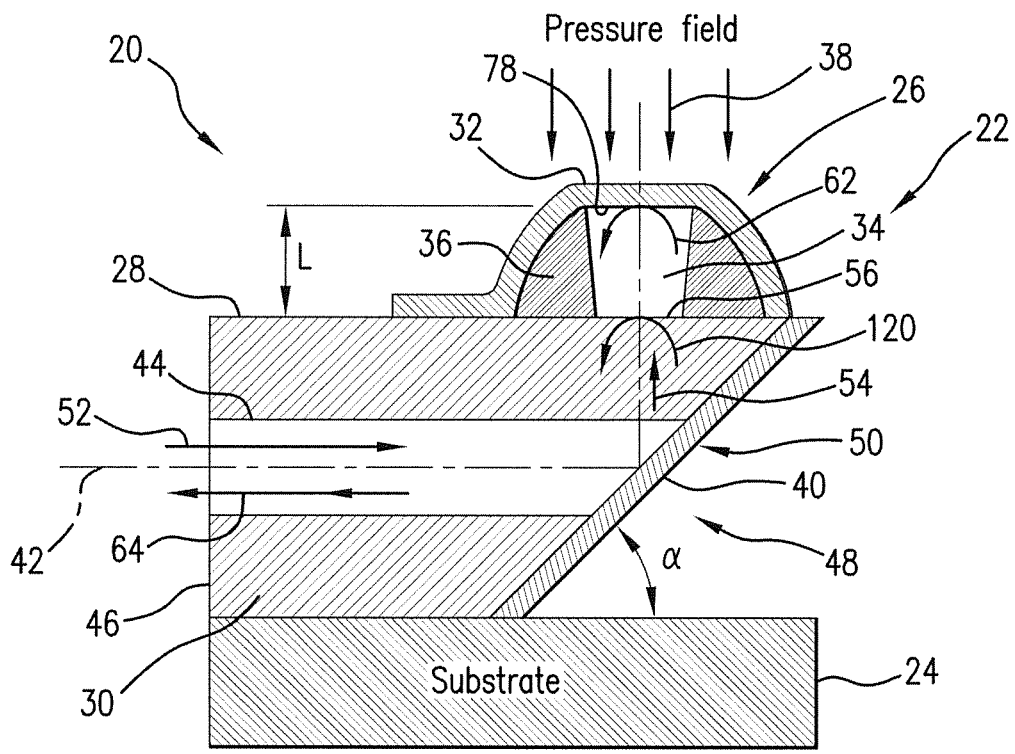
FIG. 2 is a schematic representation of a surface-mountable sensing head with an air-filled optical cavity structure of a cross-axial configuration of the present invention.

Referring to FIG. 2, an ultra-miniature pressure sensor system 20 includes a sensing head 22 which due to its cross-axial configuration is uniquely designed to permit surface mountability on a substrate 24. The sensing head 22 features an optical cavity structure 26, for example, a low finesse Fabry-Perot cavity structure, formed externally at the sidewall 28 of the optical fiber 30.

A diaphragm 32 of nanometer-scale—micrometer-scale thickness is covered on the air-filled optical cavity 34 of the optical cavity structure 26. The diaphragm 32 may be formed as a thin polymer layer or as a composite of a polymer diaphragm layer 58 and reflective diaphragm layer 60, shown in FIGS. 4H-4I, 5G, and 6D, as well as 8G-8H, and 9D-9F. The reflectivities of the polymer diaphragm layer 58 and the reflective diaphragm layer 60 are approximately 4% and 90%, respectively. As one example, a thin UV-curable polymer layer (e.g., negative photoresist) and a metal layer formed of Ag, Cu, Au, or Ti may be used to form the composite pressure sensing diaphragm 32. The shape of the diaphragm 32 may be concave, convex, flat, aspherical, or combinations thereof.

The optical cavity 34 is formed within a cavity confining layer 36 as will be presented in detail in following paragraphs. The sensing head 22 is mounted on the surface of the substrate 24 to detect pressure 38 applied to the diaphragm 32 in a direction perpendicular to the substrate surface.

The interface between the optic fiber sidewall 28 and the air-filled optical cavity 34 provides about 4% reflection. In order to increase the reflectivity in this region (for a better performance of the sensor, e.g., a better visibility), a thin metal layer (less than 50 nm in the thickness), or an optical coating (i.e., alternative layers of dielectric materials) 72, shown in FIGS. 4D-4H, 5A-5G, and 6A-6D, may be used to attain an increased level of reflectivity at the sidewall 28.

The diaphragm thickness, cavity diameter and cavity length may be adjusted during the manufacturing process to fulfill the requirements of different sensitivity and measurement range in various applications. For example, the resulting cavity length may vary from several micrometers to several hundreds of micrometers, which may be adjusted based on the intended application of the sensor by controlling the thickness of the cavity confining layer 36.

Figure 3A:
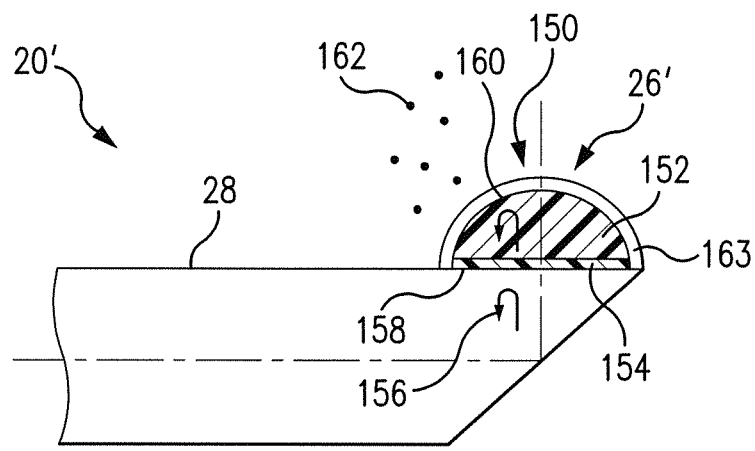
FIG. 3A-3B represent schematically fabrication of a surface-mountable sensing head with a polymer-filled optical cavity structure of the present invention.
Figure 3B:
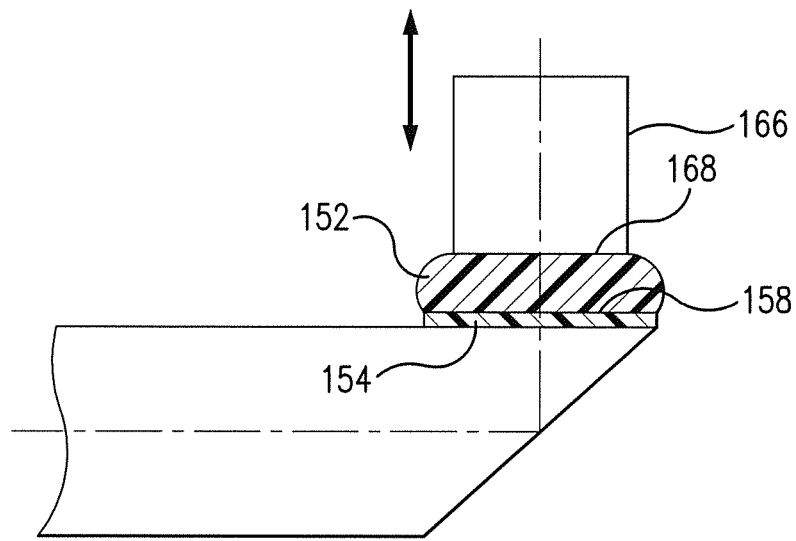

Alternatively, as shown in FIG. 3A-3B, the surface-mountable sensor 20' can be formed with an optical cavity structure 26' which is based on a polymer-filled optical cavity 150. In this embodiment, a polymer layer 152 is deposited on the optic fiber sidewall 28. The polymer layer 152 may be made from a UV- or thermally-curable polymer with low elastic modulus.

The reflection 156 at the interface 158 between the optic fiber sidewall 28 and the polymer layer 152 is insignificant due to a low (<0.1) refractive index difference between the materials of the sidewall 28 and polymer layer 152. An optical coating 154, such as a thin metal layer, or dielectric layers is used to obtain a desired reflectivity at the interface 158.

An interface 160 between the optical cavity material 152 and the ambient air 162 may have a concave, flat, convex, aspherical, or combinations thereof shape, and acts as a reflective layer due to a high (~0.3-0.5) refractive index difference therebetween. By changing the shape of the mold bottom surface 168, the polymer layer can be shaped accordingly.

The embodiment of the sensor which is based on the polymer filled cavity is not required to be formed with a diaphragm as is provided for the sensor head shown in FIG. 2. Alternatively, a reflective layer 163, for example, a metal layer, may be formed on the top of the polymer layer 152. In this case, reflected light intensity may be increased. As an additional benefit, light incident to the polymer layer 152 from the ambient, can be blocked by the layer 163. The layer 163 also can have flat, convex, concave, aspherical shape, or a combination thereof.

The subject ultra-miniature fiber-optic pressure sensor 22 may be used in array systems applicable in a wide variety of technology areas. For example, biologically compatible diaphragm materials may be used to produce the sensor suitable for space-constrained medical diagnosis and treatment applications that require minimally invasive, in vivo, monitoring of the pressures of blood, bones, joints, and bladder, etc. Further, the sensor system may be used for aerodynamic measurements without disturbing the measurand and being free of electromagnetic interferences/disturbances.

Sensors with a thin diaphragm in the range of nanometers have high sensitivity and may be used as miniature microphones for various surveillance and industry applications. The unique fabrication technique for the sensor development presented in detail infra, includes simple processes, safe procedures, and inexpensive materials, and does not require a clean room environment and associated equipment.

Referring to FIG. 2, the cross-axial configured sensing head 22 has an end surface 40 which is angled relative to the optical axis 42 of the optical fiber 30, e.g. relative the optical guide channel 44 extending between an input end 46 and a tip 48 of the optical fiber 30.

The end surface 40 is angled or inclined to provide the critical incidence angle for the light beam 52 in order to ensure a full reflection from the end surface. Preferably, the end surface 40 is angled at a 45° angle relative to the optical axis 42. However, other angles are also envisioned in the subject sensor between the end surface 40 and the optical axis 42 as long as a critical incidence angle is provided for the light beam 52.

A thin reflective coating 50 preferably in a film thickness range, optionally may be deposited at the end surface 40 to enhance reflection of light 52 traveling along the optical guide channel 44. Since the end surface is angled relative to the optical axis 42, the light beam 52 is redirected by 90° relative to the optical axis 42. The redirected light beam 54 impinges on the sidewall 28 of the optical fiber at a location 56 which is defined as the location where the optical cavity structure 26 is formed, as will be described herein in further paragraphs.

As shown in FIGS. 4H-4I, 5G and 6D, the diaphragm 32 includes a polymer diaphragm layer 58 and a reflective diaphragm layer 60 covering the polymer diaphragm layer 58. As shown in FIG. 2, when the redirected light beam 54 impinges on the diaphragm 32, it reflects (as shown by the arrow 62) and is returned to the end surface 40 to be redirected to the input end of the optical fiber along the optical guide channel 44.

Figure 10A:
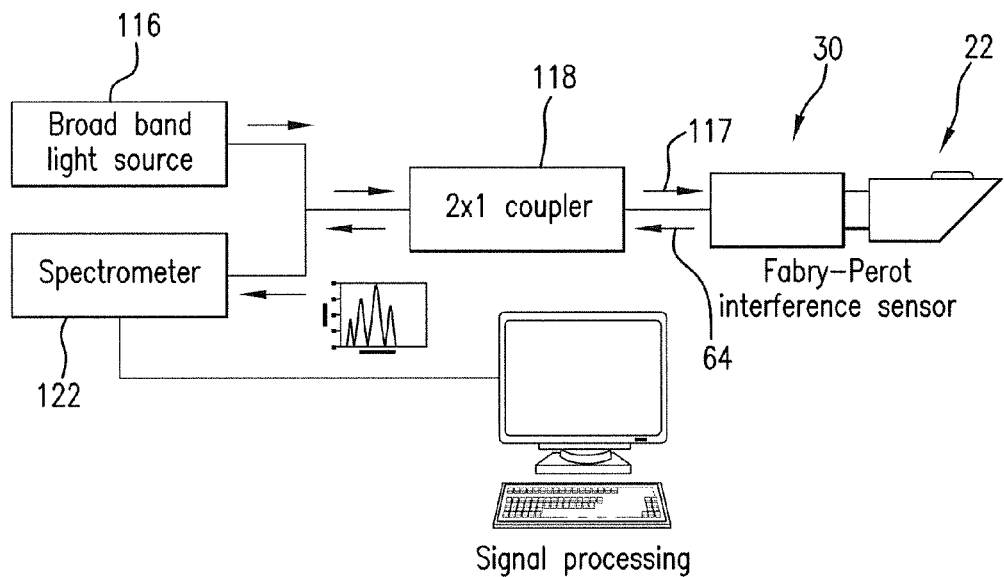
FIGS. 10A-10B show, respectively, a spectrum-based measurement scheme and a diagram representing cavity length vs. pressure of the manufactured pressure sensor.
Figure 11:
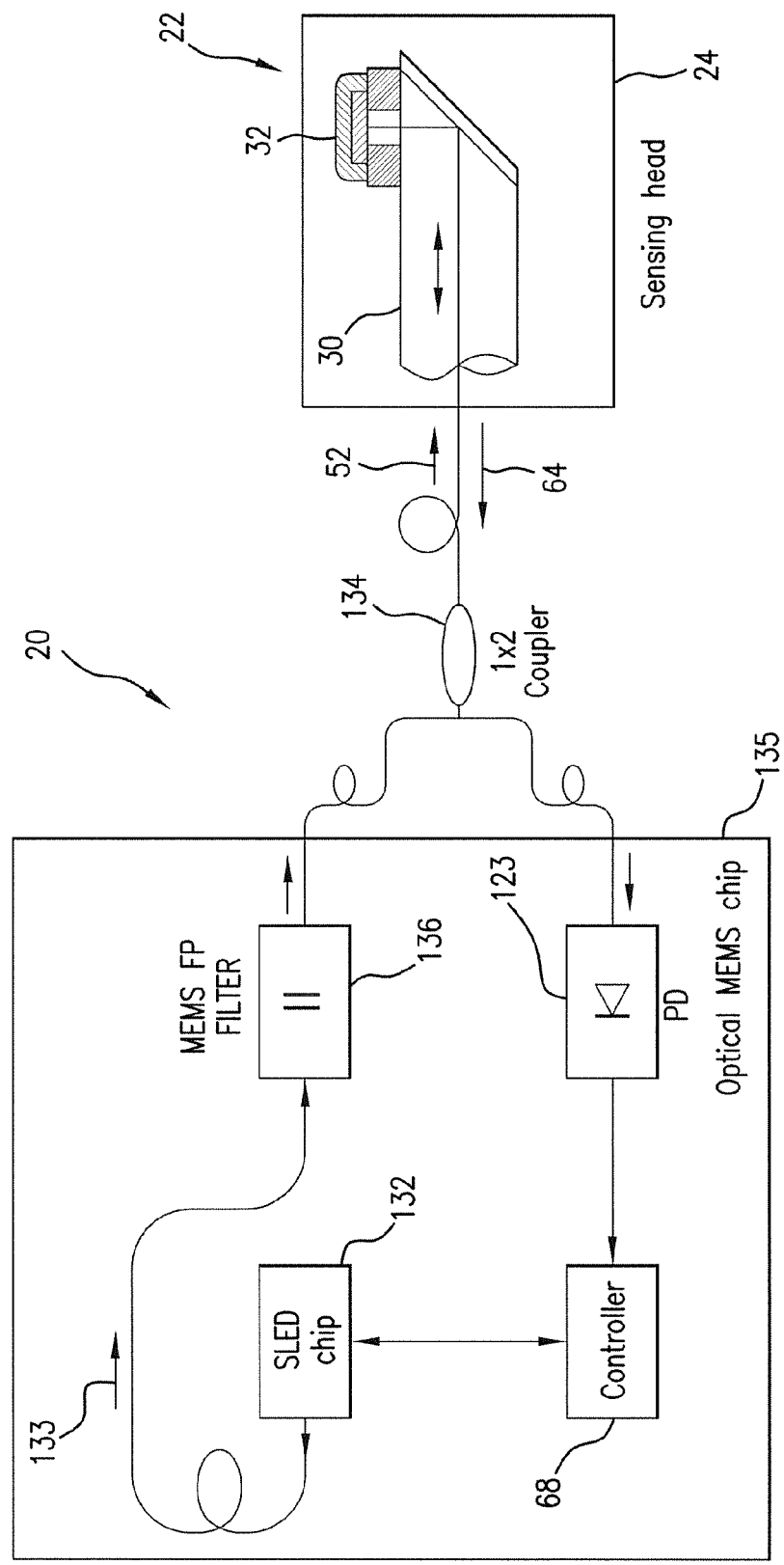
FIG. 11 is a schematic representation of a sensor system using the sensing head of the present invention.

The produced light signal constitutes an output optical signal 64 which is interrogated by a spectrometer 122 (or an optical spectrum analyzer), shown in FIG. 10A, or a photo detector 123, shown in FIG. 11, and discussed infra herein. The photo detector may be any detector which covers the wavelength range of the output optical signal. For example, a GaAs or InGaAs photo detector with the working range of 600-800 nm and 800-1600 nm may be used.

The optical characteristics of the output optical signal 64, including intensity of the signal and spectrum parameters, depend on the length of the optical cavity. When the pressure 38 is applied to the composite diaphragm 32, the diaphragm bends into the cavity 34, thereby reducing the length L of the cavity, and thereby changing the optical path of the light. The change of the optical path will change the phase of the reflected signal 62, and subsequently the optical characteristics of the output optical signal 64 detected by the spectrometer (or optical spectrum analyzer) 122 or the photo diode 123 and determined by a microcontroller (or microprocessor) 68 coupled to the photo diode, as shown in FIG. 11. The output optical signal characteristics are processed to produce the corresponding measure of the applied pressure.

With respect to the embodiment shown in FIGS. 3A-3B, the variation in the thickness of the polymer layer 152 with respect to the pressure applied onto the interface 160 is measured by demodulating the interference signal of the light reflected from both interfaces, 158 and 160. In terms of signal processing, the method used for the optical pressure sensor with a diaphragm detailed in further paragraphs may be applied.

When the pressure measurements require an absolute cavity length measurement, i.e., optical cavity length measurements through using wavelength spectrum, the thickness variation across the polymer layer 152 does not affect the measurements result. In this case, the optical length can be loosely controlled by controlling the volume of the polymer material 152, shown in FIG. 3A.

However, when using an optical measurement technique which needs a precise optical path length control, such as, for example, the intensity monitoring at the quadrature point, a molding method shown in FIG. 3B may be used. In accordance with which the optical cavity length, i.e., the thickness of the polymer layer 152, is monitored while the mold 166 moves vertically. In this method, the interference of the light reflected from the reflective layer 154 and the bottom surface 168 of the mold 166 is used.

Referring to FIGS. 4A-4I, in one of the embodiments of the current fabrication process, a tip portion of the optical fiber 30 (FIG. 4A) is peeled to remove the fiber jacket 70 as shown in FIG. 4B. Subsequently, as shown in FIG. 4C, the fiber 30 is polished to create an end surface 40, and a metal layer 50 which is deposited on the polished and cleaned end surface 40, as presented in FIG. 4D, to enhance reflectivity at the boundary of the polished surface 40. The sidewalls 28 of the fiber are covered with a thin reflective layer 72 (further referred to herein as the sidewall reflective layer) to enhance visibility of the optical signal by increasing the reflectance of the outer surface of the sidewall of the optical fiber. As shown in FIG. 4E, a positive photoresist layer 74 is subsequently deposited on the reflective material 72 on the sidewalls 28 and the end surface 40. The photoresist 74 may be coated by a dipping technique with a desired thickness. The thickness of the cavity 34 depends on the viscosity of the photoresist and the dipping conditions. Subsequently, the photoresist layer is soft baked and is exposed from the inside of the optical fiber to the UV light 76 which is focused on the input end 46 of the optical fiber 30.

The optical fiber, specifically the optical guide channel 44, and the angled end surface 40 are used to guide the UV light toward the sidewall 28. As shown in FIG. 4F, the UV light 76 is coupled to the input end 46 of the optical fiber to travel along the optical guide channel 44 towards the reflective angled end surface 40 where the UV light is steered 90°, and the redirected light 77 impinges on the sidewall 28 and the positive photoresist layer 74.

Being exposed to the UV light 77, the photoresist layer 74 changes its chemical characteristics at the area of exposure and becomes soluble to a photoresist developer which is subsequently applied to the photoresist layer 74 to remove the photoresist material (either by wet or dry etching), thereby forming the cavity 34 through the thickness of the photoresist layer 74 of predetermined length and diameter. As shown in FIG. 4G, the cavity 34 is formed in the photoresist layer 74 which is further hard baked to solidify the remaining photoresist in order to produce a durable cavity confining layer. The diameter of the cavity is defined by a beam spot size and may range in μm range. The depth of cavity, depending on the photoresist may be, for example, in the range of 15-24 μm.

Referring to FIG. 4H, the polymer diaphragm layer 58 having a uniform thickness is covered on the top 78 of the cavity 34. The polymer diaphragm layer 58 is preformed by the process described further herein, and at the time of deposition on the top of the cavity 34 has adhesive properties sufficient to permit the securement of the diaphragm to the outside wall 28 of the optical fiber without contractions. The polymer diaphragm layer 58 is then cured by ultra violet light and is fixed firmly on the sidewall of the fiber. The polymer diaphragm layer 58 is then coated with a reflective layer 60, shown in FIG. 4H, by either sputtering, evaporation, electroplating, bonding, or sticking, thus completing the fabrication of the sensing head 22. The reflective layer 60 (as well as reflective layers 50 and 72) is typically made of a metal material such as, but not limited to, gold, aluminum, silver, copper, nickel, chromium, etc.

As shown in FIG. 4I, the sensor element, e.g., the Fabry-Perot cavity structure 26, may be covered with additional polymer layers 80. These additional layers of polymer render additional protection from the external environment and improve the biocompatibility of the sensor especially in biomedical applications which expose the sensors to the body fluids such as blood, urine, etc. Additional layers 80 also provide the ability to tune the stiffness of the multi-layered diaphragm 32 to address different requirements of sensitivities and pressure measurement ranges. The stiffness of the diaphragm 32 is mainly determined by the stiffness of the reflective diaphragm layer 60 since the metal material has much higher mechanical strength than the polymer material of the polymeric diaphragm layer 58. However, adding more polymer layers 80 increases the stiffness in small steps and thus offers fine tuning of the sensitivity.

Referring to FIG. 5A-5G, the subject surface-mountable optical pressure sensor 22 may be fabricated by a laser ablation. This is an alternative method of forming the cavity 34 on the outer surface of the optical fiber 30 in a simplified manner. Initially the optical fiber 30 having the jacket 70 (shown in FIG. 5A) is polished together with the jacket to form the angled end surface 40, as shown in FIG. 5B. The end surface 40 is subsequently covered with the reflective coating 50 shown in FIG. 5C. Further, as shown in FIG. 5D, the laser light 84 is guided through the optical fiber 30. At the end surface 40 the laser light is redirected toward the sidewalls 28 and impinges thereon at the location 85 where the cavity 34 is to be fabricated. This location is found by sensing the redirected laser light 82 coming from the sidewall of the fiber by a photo detector 83 compatible with the laser used. Any laser producing light in the wavelength range of approximately 600 nm-800 nm may be used. For example, commercially available laser diodes generating in the range of 635-705 nm or 700-800 nm are suitable for this application.

Further, referring to FIG. 5E, the cavity 34 is formed by removing the polymer material of the fiber jacket 70 selectively using laser ablation. As shown in FIG. 5F, after contouring the cavity 34 by laser ablation, the reflective layer 72 is deposited which covers the surface of the fiber jacket 70 and the exposed sidewall 28 on the bottom of the cavity 34.

In the following step, the polymer diaphragm layer 58 and the reflective diaphragm layer 60 are covered on the top 78 of the cavity 34, as shown in FIG. 5G, thus completing the formation of the sensing head 22.

Referring further to FIGS. 6A-6D, another alternative fabrication technique is carried out by making the cavity 34 by a UV molding process. The fiber jacket of the optical fiber is removed and cleaved, and the polishing and metal layer deposition are performed respectively to form the reflective end surface 40 and the sidewall reflecting layer 72 as is discussed supra and shown in FIGS. 4A-4D. Subsequently, as shown in FIG. 6A, the controlled volume of the UV-curable polymer 86 is dispensed at the sidewall in proximity to the tip of the fiber. The UV-curable material may be a polymer based on urethane acrylate, acrylate, epoxy, etc.

A mold 88 contoured opposite to the shape of the intended cavity is used in this process. The light 89 (for example, laser light) is introduced through the input end of the fiber which redirects at the end surface 40 covered with metal 50, impinges on the sidewalls 28, and escapes to the outside of the fiber through the UV-curable material 86, as it is shown in FIG. 6A.

The light beam emanating through the sidewall of the optical fiber is used for precise positioning of the mold 88. The mold is fabricated with Si, glass, polymer, or metal with an anti-adhesion surface treatment, and is mounted on a high precision stage. If the mold 88 is formed of a transparent material, such as polymer or a glass, a reflective layer is coated on the mold to facilitate reflection of light. As shown in FIG. 6A, the mold 88 is positioned to be in axial alignment with the emanating laser light by monitoring the intensity of the light 92 reflected from the end facet 90 of the mold 88. When the mold 88 is precisely aligned relative to the optical axis of the emanating laser light at the position where the cavity is to be formed, the reflective signal 92 reaches its maximum that is detected by the photo detector (Power Meter) 66.

After finishing the axial alignment, the mold 88 is lowered into the UV-curable polymer 86 to bring the end facet 90 in contact with the sidewall reflective layer 72, as shown in FIG. 6B. Subsequently, the UV-curable polymer 86 is cured by UV light. After the polymer 86 has been UV-cured, the mold 88 is removed, as shown in FIG. 6C, thereby leaving the cavity 34 formed in the material 86. As further presented in FIG. 6D, the polymer diaphragm layer 58 and the reflective diaphragm layer 60 are deposited on the top 78 of the cavity 34.

The fabrication technique for the subject pressure sensor embedded on the optical fiber is easily adapted for batch production that yields high device-to-device uniformity.

Referring to FIGS. 7A-7B, a fiber holder 100 may be used to hold and align a plurality of optical fibers 30. The fiber holder 100 may be used which includes both a bare silicon wafer 106 and a silicon wafer 102 wherein a plurality of grooves 104 are etched. In use, a plurality of optical fibers 30 with their tip portions cleared of the jackets 70, are positioned in the grooves 104 in aligned and substantially parallel relationship each to the other and covered with the bare silicon wafer 106. An adhesive, for example, a wax 108 may be used to stably secure the fibers 30 within the fiber holder 100. The optical fibers are then polished at their tips to form angled end surfaces, for example, a 45° angle, which are cleaned and deposited with the metal layer. Further, the manufacturing steps shown in FIGS. 4E-4G are simultaneously performed for all the optical fibers held in the fiber holder 100 by dipping the tips of the fibers in the photoresist, UV-patterning and developing the photoresist in sequential order.

In order to form the polymer diaphragm layer 58 at the top of the cavities 34 formed externally on the sidewalls of the optical fibers, the polymer layer is pre-formed in a separate process. Deionized water is placed in a Petri dish. A hard ring holder 110 (shown in FIG. 7B) is placed in the Petri dish under the surface of the water. A controlled volume of a UV-curable polymer is dispensed onto the surface of the deionized water. The polymer floats over the water surface and spreads to form a thin film of polymer on the water surface. By observing the coloration of the polymer film and controlling the spreading time, the film thickness may be controlled with high accuracy. Using this technique, a very thin layer of the polymer is obtained.

The polymer layer is then pre-cured by UV light at a predetermined power density and for a predetermined time period sufficient to accomplish the pre-curing process, thereby forming the polymer layer 112, that has a uniform thickness across the entire area. At this stage, the polymer layer 112 is strong enough to be removed from the water.

The hard ring holder 110 is lifted to be contagious with the polymer layer and then is removed from the water surface at a predetermined angle to lift the pre-cured polymer layer 112 out of the water and cover the fabricated cavities at the end of the fibers, as shown in FIG. 7B. The hard ring holder 110 with the polymer film 112 is moved downwardly towards the fiber holder 100 while the fibers are pushed up to break the polymer film. As a result, each fiber end is covered with a patch of the polymer film. Since the polymer film has a uniform thickness across its entire area, the cavities 34 formed on the optical fibers, are covered with the polymer diaphragm layer of identical thickness. The polymer film at this stage has a viscosity which is sufficient to attach the polymer diaphragm to the sidewalls of the optical fibers without contractions.

Further, the diaphragms are cured by the UV light and thus are secured firmly on the sidewalls of the fibers. The polymer diaphragms are further coated with the reflective diaphragm layer 60 by sputtering, evaporation, electroplating, bonding, or sticking for all optical fibers simultaneously. The reflective material is a metal which includes gold, aluminum, silver, copper, nickel, chromium, etc. The batch production of the pressure sensors embedded on optical fibers includes well developed simple processes, safe procedures and inexpensive materials and does not require the use of a clean room environment and equipment.

An alternative batch fabrication technique is presented in FIGS. 8A-8H. Although illustrated for the fabrication of co-axially configured sensors, this method is also applicable for batch production of the cross-axial configured sensors. Also, although illustrated for three fiber based sensors, the principles of the method presented in FIGS. 8A-8H are also applicable to a batch production of a larger number of sensors.

As shown in FIG. 8A, the optical fibers 30 are secured in a holder 101 with mounting wax; and the end faces 31 of the fibers 30 are being polished. The fiber jacket may be left on the fibers.

Subsequently, as shown in FIG. 8B, a controlled volume of UV-curable polymer (photoresist) 103 is dispensed on the wafer 101.

A preformed mold 33 is contoured "opposite" to the shape of a plurality of cavities to be formed at the fibers 30. The mold 33 may be fabricated with Si, glass, polymer, or a metal with an anti-adhesion surface treatment. The mold 33 is mounted on a high-precision stage (not shown) to provide precise alignment of "anti-cavity" structures 35 with locations of the end faces 31 of the fibers 30 in the wafer 101.

After axially (horizontally) aligning the mold 33 with the end faces of the fibers, and lowering the mold into the polymer (photoresist) 103, the latter is exposed to the UV light via a shadow mask 37 to pattern the photoresist 31 as shown in FIG. 8C.

After the photoresist 103 is cured and the mold is removed, as shown in FIG. 8D, coaxial cavities 34 are formed in the end faces of the fibers 30. Subsequently, hard baking may be performed.

As shown in FIG. 8E, a polymer diaphragm film 112 is covered on the tops of the cavities 34. A micromachined punch (not shown) having a plurality of openings aligned with the end faces of the fibers is pressed down to remove the unnecessary portions of the polymer film 112 as shown in FIG. 8F. Further, as shown in FIG. 8G, a metal layer 114 is deposited on the diaphragms 112, thus forming cavities 34 each covered with the composite diaphragm 32.

Finally, the mounting wax is dissolved with heat or a solvent to complete the fabrication process to release the fabricated sensors 20, as shown in FIG. 8H.

As described in previous paragraphs, the end surface 40 of the optic fiber is angled relative to the axis of the optical guide channel in the optic fiber by a predetermined angle α (shown in FIG. 2), to provide the critical incidence angle for the light incident on the end surface 40 to redirect the light with the least loss towards the fiber sidewall 28. It is preferred that the end surface forming the angle α of substantially 45° relative to the axis 42 of the optic fiber, which enables a 90° redirection of the light towards the fiber sidewalls, thereby attaining optimal performance and surface mountability of the subject pressure sensor.

During the fabrication process, errors in the polishing of the end surface may lead to the angle α deviations from 45°. If the deviation of the angle α from 45° is too large (over several degrees), the power of the light emanating from the fiber sidewall diminishes exponentially due to large internal reflections. Also, with the angle deviation, the reflected light does not return to the end of the fiber core and be guided to optical waveguide. Therefore the reflected intensity will be diminished drastically due to this dominant factor. Therefore measures are taken to prevent a large deviation of the angle α from 45°.

However, small deviation (several degrees) from 45° may be compensated for in order that the overall performance of the resulting sensor does not degrade substantially.

As shown in FIG. 9A, for the end surface angled at 45°, the mold 88 (used in the process shown in FIGS. 6A-6D), has the optical axis 91 extending in perpendicular to the optical axis 42 of the optic fiber 30. However, when it is determined that the end surface 40 deviates from 45° (for example, the angle is 40°, as shown in FIG. 9B, or 50°, as shown in FIG. 9C), and the light 93 reflected therefrom travels in the direction other than 90° relative to the optical axis 42, in the cavity fabrication process, the mold 88 should be tilted, as shown in FIGS. 9B-9C to align the mold's axis 91 with the direction of the light 93 reflected from the end surface 40.

The fabrication of the composite diaphragm 32 on the top of the cavity 34 for the case scenarios of the angle α of 45°, 40°, and 50°, is presented in FIGS. 9D, 9E, and 9F, respectively. It is important to ensure that the bottom 56 and the top 57 of the cavity 34 are strictly parallel for optional sensor performance, i.e. for high intensity level. If the parallelism between the bottom and top of the cavity is provided, then the light 93 reflected from the end surface 40 is directed to the cavity's bottom 56 and top 57 in the same direction thus attaining the highest reflectance level.

Referring further to FIG. 2, the cavity length L of the optical pressure sensor depends on the pressure 38 applied perpendicularly to the diaphragm 32 formed on the top of the cavity 34. When the pressure is applied, the diaphragm deflects and the length of the optical cavity changes. The deflection of the diaphragm 32 is proportional to the pressure and may be measured by several optical signal processing methods including spectrum based measurements and intensity-based measurements.

The principles of the spectrum based measurements are shown in FIG. 10A where white light may be used as an input light source 116. The white light 117 travels to the sensing head 22 through a 2×1 coupler 118. In the fiber 30, as shown in FIG. 2, the light travels along the optical guide channel towards the reflective angled end surface and is redirected (beam 54) toward the sidewall 28 of the optical fiber. At the sidewall reflective layer 72, a portion 120 of the light beam is reflected, while another portion of the redirected light beam 54 passes through the sidewall reflective layer 72 and travels along the length of the optical cavity 34 and reflects (as shown by the arrow 62) at the boundary between the top 78 of the cavity 34 and the diaphragm 32. Both reflected light beams, 120 and 62, interfere with each other on their return inside the fiber, and when the spectrum of the output light signal 64 is scanned by a spectrometer (or an optical spectrum analyzer) 122, some peaks would appear on the spectrum diagram. The cavity length is calculated by (Eq. 1):

$$L = \frac{\lambda_1 \lambda_2}{2(\lambda_2 - \lambda_1)} \quad \text{(Eq. 1)}$$

where L is the cavity length, and $\lambda_1$, $\lambda_2$ represent the wavelengths of two adjacent peaks found on the spectrum diagram.

Figure 10B:
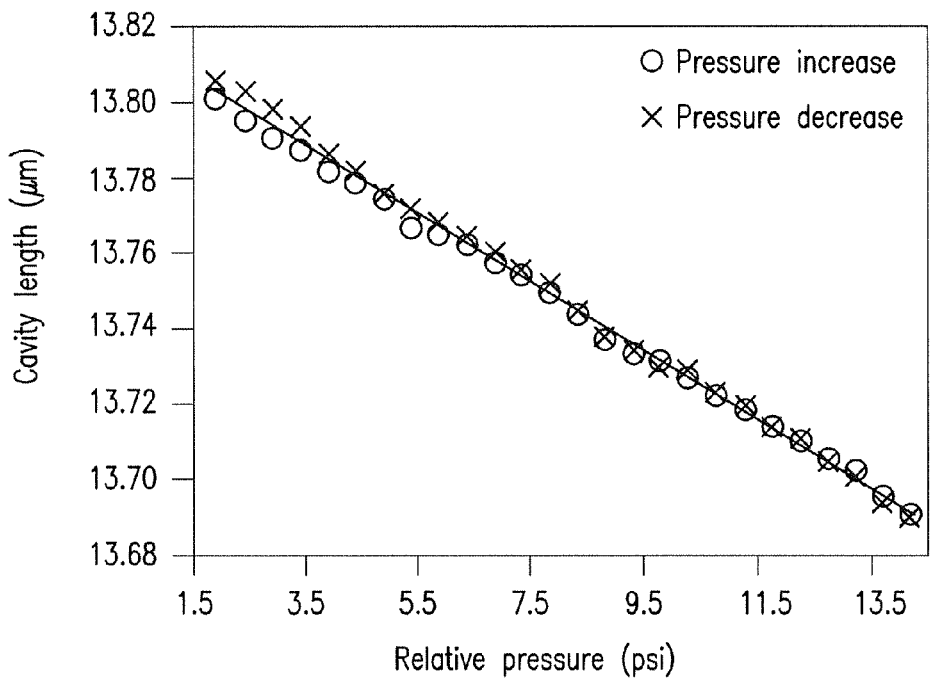

Since the wavelength measurement has high resolution (~1 pm), the deflection of the diaphragm 32 may be measured with the resolution of 1 nm. Such a high resolution ensures that very small deflection of the diaphragm is detected with high precision. FIG. 10B represents a diagram of the cavity length vs. pressure. The spectrum based measurements have enhanced sensitivity, rather large dynamic range, and are insensitive to light source fluctuations.

An intensity-based measurement scheme (not shown in the drawings), uses a light source generating the light whose coherence length is longer than the cavity length. The light from the light source passes through a coupler into the input end of the sensing head. The interference between the light beams, 120 and 62, shown in FIG. 2, causes intensity variation of the output optical signal with respect to the optical phase difference between lights 120 and 62. The intensity variation is calculated by (Eq. 2), $$I = I_1 + I_2 + \sqrt{2I_1 I_2} \cos \phi \quad \text{(Eq. 2)}$$

where $$\phi = 4\pi n L / \lambda \quad \text{(Eq. 3)}$$

where L is the cavity length, $I_1$ and $I_2$ represent the intensity of the light reflected from the outer sidewall of the fiber and the diaphragm reflective layer, respectively, $\phi$ is a phase shift defined by refractive index n of the cavity medium, the cavity length L, and $\lambda$ is the wavelength of the light generated by the light source. The intensity of the output optical signal 64 is measured by a power meter (photodiode). The deflection of the diaphragm 32 due to the outside pressure 38 thus may be measured with high accuracy.

In order to correlate the applied pressure field with the optical characteristics of the output optical signal 64, the sensor calibration is performed with the use of a reference sensor. To calibrate the manufactured sensor, any type of commercially available well calibrated pressure sensor may be used. In the present system, a Kulite sensor was used as a reference for static pressure calibration. Pressure reading was made from the reference sensor, and the cavity length was measured at the same time with the optical interrogation system shown in FIG. 10A. From the calibration, the relationship between the cavity length and the pressure was attained. This relation was exploited in calculating actual pressure from the cavity length values.

Sensor calibration was performed on the fabricated cavity having length L approximately 14 μm with Ni/Ti coating on the diaphragm of 0.3 μm thickness. Linear relationship was obtained between optical power and static external pressure in the pressure range for calibration between 0-20 psi. A sensitivity of 0.009 μm/psi was attained with the sensor calibration.

The sensing heads 22 are envisioned as a part of a variety of sensor systems 20 using one or an array of the subject sensing heads. For example, as shown in FIG. 11, the sensor system 20 uses a single sensing head 22 on the substrate 24 optically coupled through a 1×2 coupler 134 to the optical MEMS (microelectromechanical) chip 135. The MEMS chip 135 carries a SLED chip 132 to produce a light signal 133 which passes through a Fabry-Perot filter 136 and the coupler 134 prior to being optically coupled to the fiber 30 (light 52). The output optical signal 64, which carries information on the pressure applied to the diaphragm 32, passes through the coupler 134 to the photo diode 123, and is processed by the microcontroller (or microprocessor) 68 to generate measurements of the pressure of interest.

The sensing head 22 is also envisioned as a part of integrated sensor networks, including spatial-division-multiplexing (SDM) systems with a plurality of sensing heads 22 and the optical MEMS (microelectromechanical systems) chip which integrates a signal processing element.

Figure 12:
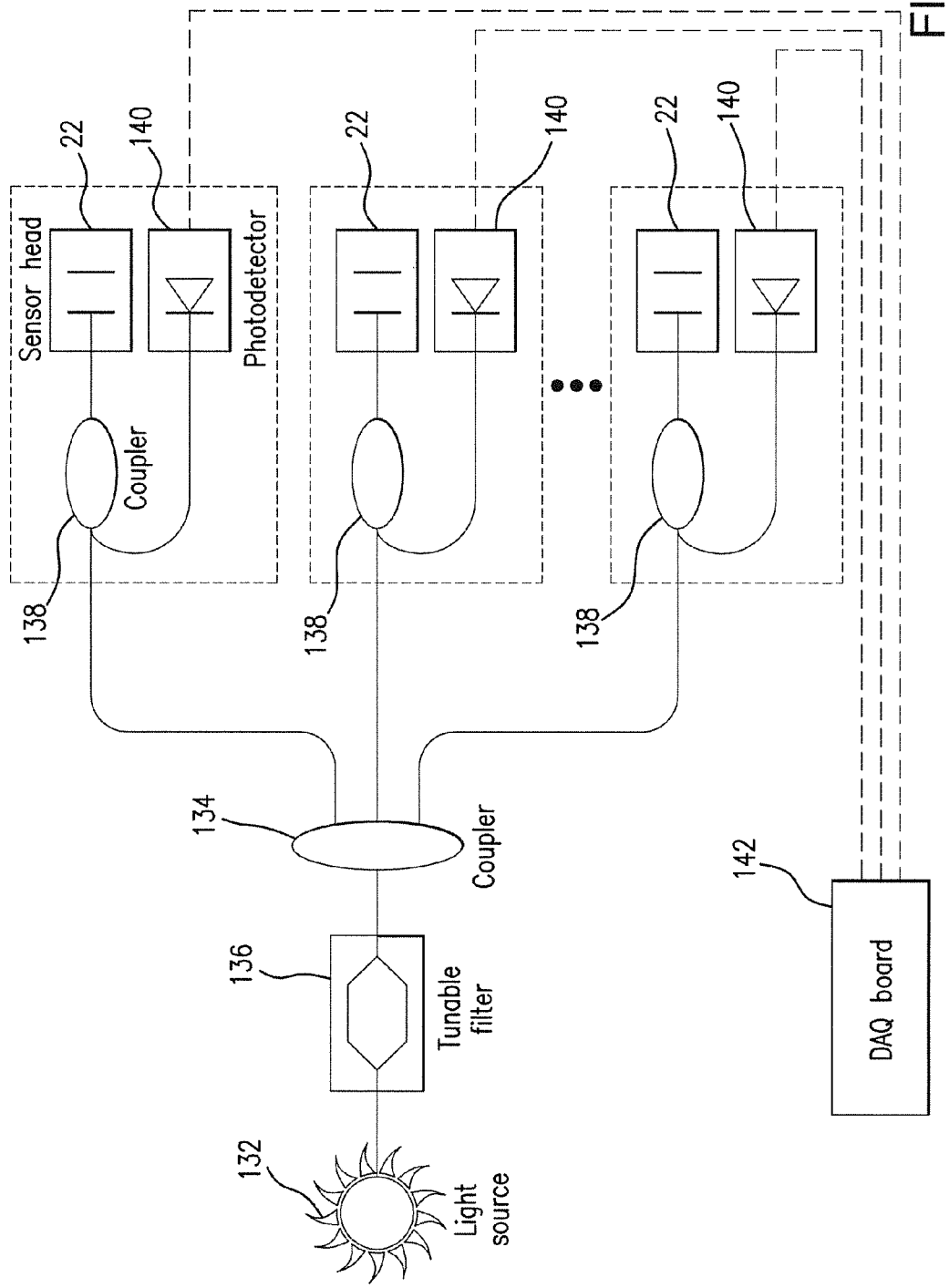
FIG. 12 is a schematic representation of an integrated sensor network using an array of the sensing elements of the present invention.

Shown in FIG. 12, is a low coherence fiber optic interferometer (LCFOI) system that may be used to measure dynamic response of the Fabry-Perot pressure sensor. Light from a broadband source 132 (such as, for example, a superluminescent light emitting diode (SLED)) is first sent to a 1×N coupler 134 via a tunable Fabry-Perot filter 136 that serves as a reference interferometer. The light from each of the output ports of the 1×N coupler 134 is then sent to several (depending on the number N of sensors) 1×2 couplers 138. At the output of each coupler 138, the light beam is directed to a Fabry-Perot (FP) interferometer based pressure sensing head 22, acting as the sensing interferometer. The reflected light from each FP sensor 22 is then coupled back to a photo detector 140.

Maximum sensitivity may be achieved when the initial differential optical path difference (OPD) is at the vicinity of quadrature points, i.e.

$$OPD = L_s - L_r = \frac{2m-1}{4} \lambda \quad \text{(Eq. 4)}$$

where $L_r$ and $L_s$ are the cavity length of the reference interferometer and the sensing interferometer, respectively, and m=0, ±1, ±2 . . . .

The obtained signal which is proportional to the measured pressure is sent to an oscilloscope for display or to a data acquisition board 142 for data analysis. This configuration is a tree topology spatial-division multiplexing sensor network, which may be used to interrogate an array of the miniature pressure sensors 22. This scheme is applicable both with the cross-axial sensing heads 22, and co-axial sensing heads.

In the integral approach on a single substrate shown in FIG. 11, the resulting footprint may be about 1.5×2. Total sensor height of less than 200 μm has been achieved with the present design.

The miniature surface-mountable fiber-optic pressure sensor of the present invention is mounted on a surface and measures with high precision dynamic pressure directed perpendicular to the surface. By using the optical fiber and the angled end surface as the light guide to expose photoresist for forming the cavity, an accurate position of the cavity may be attained which is satisfied without the use of high accuracy masks or alignment systems. In the design using a fiber jacket as a cavity confining layer, a relatively thick cavity may be obtained by the laser machining, wet etching, and dry etching in an efficient and inexpensive way. The versatility of the subject method allows the use of the UV imprint lithography for formation of the cavity where a mold is used made of Si, glass or metal with anti-adhesion surface treatment.

The formed sensor is fully bio-compatible since it is covered with protective polymer layers. Also, the coarse and fine tuning of the diaphragm stiffness may be attained by adjusting metal layer thickness and/or the diameter of cavity, to address different applications, which have different pressure ranges and require different sensitivities, by controlling the number of polymer layers on the composite diaphragm and the diameter of the Fabry-Perot cavity.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A surface-mountable ultra-miniature fiber-optic pressure sensor system, comprising:
   at least one sensing head, said at least one sensing head being formed on an optical fiber having an optical guide channel defined within sidewalls and extending between an input end and a tip end of said optical fiber, wherein said tip end of said optical fiber is formed with an end surface angled at a predetermined angle relative to an optical axis of said optical guide channel of said optical fiber, wherein said angled end surface redirects light traveling along said optical guide channel from said input end toward said tip end to impinge on said sidewall of said optical fiber at a predetermined location thereof; and
   an optical cavity structure formed at said predetermined location at said sidewalls of said optical fiber;
   wherein optical characteristics of an optical output signal emanating from the input end of said optical fiber correspond to a pressure applied to said optical cavity structure.

2. The surface-mountable ultra-miniature fiber-optic pressure sensor system of claim 1, wherein said predetermined angle of said end surface relative to said optical axis provides a critical incidence angle of said light incident on said end surface.

3. The surface-mountable ultra-miniature fiber-optic pressure sensor system of claim 1, wherein said optical cavity structure includes:
   a cavity confining layer formed on said sidewalls, said cavity confining layer having a cavity formed through the thickness thereof, and
   a pressure sensing diaphragm formed on said cavity confining layer and covering a top of said cavity, said pressure sensing diaphragm including a diaphragm layer selected from a group consisting of:
   at least one thin polymer layer, at least one reflective diaphragm layer, and a combination of said at least one reflective diaphragm layer and said at least one polymer diaphragm layer.

4. The surface-mountable ultra-miniature fiber-optic pressure sensor system of claim 3, wherein said thin polymer layer includes an UV-curable polymer layer.

5. The surface-mountable ultra-miniature fiber-optic pressure sensor system of claim 3, wherein said at least one reflective diaphragm layer includes at least one metal layer.

6. The surface-mountable ultra-miniature fiber-optic pressure sensor system of claim 3, wherein said pressure sensor diaphragm has a shape selected from a group consisting of: concave shape, flat shape, convex shape, aspherical shape, and combinations thereof.

7. The surface-mountable ultra-miniature fiber-optic pressure sensor system of claim 3, further comprising at least one additional polymer layer formed on said at least one reflective diaphragm layer.

8. The surface-mountable ultra-miniature fiber-optic pressure sensor system of claim 3, wherein said cavity confining layer includes a photoresist layer.

9. The surface-mountable ultra-miniature fiber-optic pressure sensor system of claim 3, wherein said cavity confining layer is a jacket of said optical fiber.

10. The surface-mountable ultra-miniature fiber-optic pressure sensor system of claim 3, wherein said cavity confining layer is an UV-curable material deposited on said sidewalls of said optical fiber at said predetermined location thereof.

11. The surface-mountable ultra-miniature fiber-optic pressure sensor system of claim 1, wherein said optical cavity structure is a Fabry-Perot cavity.

12. The surface-mountable ultra-miniature fiber-optic pressure sensor system of claim 1, wherein said angled end surface is covered with a first reflective layer.

13. The surface-mountable ultra-miniature fiber-optic pressure sensor system of claim 3, further comprising a second reflective layer formed on said sidewall at said predetermined location thereof.

14. The surface-mountable ultra-miniature fiber-optic pressure sensor system of claim 1, further comprising at least one light source generating an optical input signal coupled to said input end of said optical fiber of said at least one sensing head, at least one light detector optically coupled to said at least one sensing head to detect said optical output signal emanating therefrom, and a signal processing unit coupled to said at least one light detector to determine said characteristics of said optical output signal.

15. The surface-mountable ultra-miniature fiber-optic pressure sensor system of claim 1, wherein said optical cavity structure includes:
a polymer layer formed at said predetermined location at said sidewalls of said optical fiber, and
wherein a first interface is formed between a surface of said polymer layer and the ambient air, said first interface forming a first reflective surface of said polymer layer.

16. The surface-mountable ultra-miniature fiber-optic pressure sensor system of claim 15, further comprising a reflective layer positioned on said interface.

17. The surface-mountable ultra-miniature fiber-optic pressure sensor system of claim 15, further including a second reflective surface formed from a reflective material and disposed between said polymer layer and said sidewalls of said optic fiber.

18. The surface-mountable ultra-miniature fiber-optic pressure sensor system of claim 15, wherein said polymer layer has a shape selected from a group consisting of: concave shape, flat shape, convex shape, aspherical shape, and combinations thereof.

19. The surface-mountable ultra-miniature fiber-optic pressure sensor system of claim 15, wherein said polymer layer is formed from a material with a low elastic modulus.

20. A method for manufacturing a surface-mountable ultra-miniature fiber-optic pressure sensor system, comprising the steps of:
fabricating at least one sensing head by:
(a). contouring a tip end of an optical fiber with an end surface angled at a predetermined angle relative to an optical guide channel defined by sidewalls of said optical fiber,
(b). inputting a light beam at an input end of said optical fiber, wherein said light beam travels from said input end toward said tip end of said optical fiber along said optical guide channel thereof and redirects at said angled end surface toward a predetermined location at said sidewalls of said optical fiber, and
(c). forming an optical cavity structure at said predetermined location of said sidewalls of said optical fiber.

21. The method of claim 20, further comprising the step of: after said step (a), depositing a first reflective layer on said end surface.

22. The method of claim 20, further comprising the steps of:
prior to said step (a), removing a fiber jacket from said optical fiber; and
prior to said step (b), covering said sidewalls with a second reflective layer; and
depositing a photoresist layer on said second reflective layer;
wherein in said step (b), said light beam is a UV light beam, and wherein in said step (c), said photoresist layer is exposed to said UV light beam traveling along said optical guide channel and redirected by said reflective angled end surface toward said sidewalls, thereby UV-patterning said photoresist layer at said predetermined location, and
removing said photoresist layer from said predetermined location, thereby forming a cavity of said optical cavity structure.

23. The method of claim 22, wherein in said step (b), said light beam is a laser beam, further comprising the steps of:

prior to said step (c), determining said predetermined location by sensing a laser light beam emanating through said sidewalls of said optical fiber,
in said step (c), forming said cavity of said optical cavity structure by exposing a fiber jacket to a material subtraction technique from outside of said fiber jacket to remove the fiber jacket material at said predetermined location, and
after said step (c), depositing a second reflective layer at least on said sidewalls defined within said cavity.

24. The method of claim 20, wherein in said step (b), said light beam is a laser beam, further comprising the steps of:
prior to said step (a), removing a fiber jacket from said optical fiber to expose said sidewalls thereof;
prior to said step (b), covering said sidewalls with a second reflective layer;
prior to said step (c), depositing a predetermined volume of a UV-curable material on said second reflective layer in proximity to said tip end of said optical fiber; and
in step (c), positioning a mold above said UV-curable material in alignment with said predetermined location, said mold having a shape opposite to a contour of said cavity,
finding an alignment position of said mold with said predetermined location when said optical output signal corresponding to a laser light beam reflected from said mold reaches maximal power,
lowering said mold through said UV-curable material to attain a contiguous contact with said second reflective layer,
curing said UV-curable material; and
removing said mold therefrom.

25. The method of claim 22, further comprising the steps of:
in said step (c), forming a diaphragm by covering the top of said cavity with a polymer diaphragm layer, and
covering said polymer diaphragm layer with a reflective diaphragm layer.

26. The method of claim 25, further comprising the steps of:
prior to covering said polymer diaphragm layer on the top of said cavity,
pre-forming said polymer diaphragm layer having a uniform thickness in a nanometer-scale range.

27. The method of claim 25, further comprising the step of:
tuning a sensitivity of said at least one sensing head by controlling a number of additional polymer layers covered on said reflective diaphragm layer.

28. The method of claim 20, further comprising the steps of:
in said step (a), contouring said tip end of the optical fiber to angle said end surface relative said optical guide channel at said predetermined angle to provide the critical incidence angle of said light beam incident to said end surface.

29. The method of claim 20, further comprising the steps of:
after said step (b), forming a second reflective layer, said polymer layer having a shape selected from a group consisting of: concave shape, flat shape, convex shape, aspherical shape, and combinations thereof.

30. The method of claim 29, wherein said polymer layer is formed of a UV—or thermally-curable polymer with a low elastic modulus.

31. The method of claim 28, further comprising the steps of:
in said step (c), adjusting a disposition of an optical axis of said optical cavity structure to align with said light beam redirected at said angled end surface if said end surface is angled relative to said optical guide channel with a deviation from said predetermined angle.

32. A method for manufacturing a plurality of ultra-miniature fiber-optic pressure sensors, comprising the steps of:
- (a). securing a plurality of optical fibers to a wafer in alignment each with the other;
- (b). polishing the tips of said plurality of optical fibers to form end surfaces angled at a predetermined angle relative to an optical guide channel of each optical fiber,
- (c) dispensing an UV-curable polymer layer on said polished tips of said plurality of optical fibers,
- (d) pre-forming a wafer scale mold, said mold being patterned to form a plurality of islands each having a contour of a cavity to be formed,
- (e) positioning said wafer scale mold above said UV-curable polymer layer in alignment between each of said islands and a respective tip of said plurality of optic fibers,
- (f) lowering said wafer scale mold on said UV-curable polymer layer,
- (g) exposing said UV-curable polymer layer to UV radiation through said wafer scale mold,
- (h) removing said wafer scale mold,
- (i) developing said UV-curable polymer layer to create said cavity at said tip of each of said optic fiber,
- (j) covering a polymer diaphragm on a top surface of said tip of said plurality of optic fibers,
- (k) removing said polymer diaphragm between said tips of said optic fibers,
- (l) coating a reflection layer on said polymer diaphragm on said tip of each optic fiber, thereby forming a plurality of optic pressure sensors, and
- (m) releasing fabricated optic pressure sensors from said wafer.

33. The method of claim 32, wherein said predetermined angle is selected from a group consisting substantially of 45° and 90°.

\* \* \* \* \*